3,006,920
N-SUBSTITUTED 2,5,BISHALOMETHYL-PYRROLIDINES
Werner Richard Boehme, Somerville, and Edgar Siegmund Schipper, Highland Park, N.J., assignors to Ethicon, Inc., a corporation of New Jersey
No Drawing. Filed July 6, 1959, Ser. No. 824,954
9 Claims. (Cl. 260—313)

This invention relates to a new series of organic compounds. More particularly, the present invention is concerned with 1-R-2,5-bishalomethylpyrrolidines, acid addition and quaternary ammonium salts thereof and methods for their preparation.

The novel 1-R-2,5-bishalomethylpyrrolidines of this invention are those wherein the R substituent in the 1-position is alkyl, preferably lower alkyl, consisting of 1 to 7 carbon atoms, such as methyl, ethyl, propyl, isopropyl, butyl, isobutyl, pentyl, hexyl and heptyl; aryl, preferably mononuclear aryl such as phenyl, having, if desired, substituents such as halo, i.e., bromo, chloro, fluoro or iodo, alkoxy, i.e., methoxy, ethoxy, propoxy, butoxy or alkyl, i.e., methyl, ethyl or propyl; or aralkyl such as benzyl or β-phenethyl having, if desired, further substituents such as halo, alkyl or alkoxy as shown above. Halogen substituents in the 2 and 5- positions on the pyrrolidine ring may be fluoro, bromo, iodo or, preferably, chloro.

The preferred method for preparing the compounds of this invention, and one intended to be included within the scope of this invention, comprises reducing the appropriate 1-R-2,5-dicarbomethoxypyrrolidine to the corresponding 2,5-diol and esterifying the latter to form the desired 2,5-bishalomethylpyrrolidine.

Reduction of the 1-R-2,5-dicarbomethoxypyrrolidine is preferably accomplished with a di-light metal hydride such as lithium aluminum hydride, magnesium hydride or sodium aluminum hydride, advantageously under reflux conditions. Alternatively, if desired, the reduction may be carried out with catalytically-activated hydrogen, for example, hydrogen activated by a nickel catalyst such as Raney nickel or hydrogen in statu nascendi; with alkali metals and alcohols, for example, sodium and ethanol or butanol. The reduction may also be performed electrolytically.

The reduction is carried out in the presence of a suitable, non-reactive organic solvent such as a hydrocarbon solvent, a halogenated hydrocarbon, an ether for example, benzene, toluene, xylene, hexane, heptane, tetrahydrofuran, diethylether, dioxane, etc.

Esterification of the diol is advantageously accomplished by reaction with an agent capable of splitting off water and adding a halogen substituent, as for example an acid halide such as a thionyl halide, phosphorous halide and phosphorous oxyhalide such as phosphorus trichloride, phosphorus oxychloride or, preferably, thionyl chloride. The reaction is carried out in the absence or, preferably, in the presence of a non-reactive organic solvent such as one of those listed above.

The compounds of this invention may be converted to their therapeutically useful acid addition salts by reaction with an appropriate acid, as for example an inorganic acid such as a hydrohalic acid, i.e., hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric citric, benzoic, cinnamic, mandelic, methanesulfonic, ethanesulfonic, hydroxyethanesulfonic, picric benzenesulfonic, p-toluenesulfonic, salicylic, p-aminosalicylic, 2-phenoxy-benzoic or 2-acetoxy-benzoic acid.

Depending upon the conditions employed during the course of the reaction, the novel compounds are obtained either in the form of the free bases or salts thereof. The salts are converted to the free bases in the usual manner, e.g., by reaction with alkali such as sodium or potassium hydroxide. The bases can be converted to their therapeutically useful acid addition salts by reaction with an appropriate organic or inorganic acid (supra).

The novel compounds may be converted into the corresponding quaternary ammonium compounds by reaction of the tertiary bases with an ester formed by a hydroxylated lower hydrocarbon compound with a strong inorganic or organic acid. Hydroxylated lower hydrocarbon compounds contain from 1 to 7 carbon atoms and the esters thereof are, more especially, those with mineral acids, such as hydrochloric, hydrobromic, hydriodic or sulfuric acid. Specific examples of such esters are lower alkyl halides—methyl iodide, ethyl bromide, propyl chloride; lower alkenyl halides—allyl bromide; di-lower alkyl—sulfates—dimethyl sulfate, diethyl sulfate; lower alkyl arylsulfonates—methyl p-toluolsulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are lower alkanols such as ethanol, propanol or butanol; or organic acid amides such as formamide or dimethylformamide: when lower alkyl halogenides are used as quaternizing agents, formamide and dimethylformamide are the preferred solvents and the reaction is advantageously run in a closed vessel under pressure, the latter being built up by heating.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by treating the quaternary salts with an anion exchanger or by electrodialysis. Quaternary ammonium salts may be prepared from the resulting base by reaction with acids such as those mentioned hereinabove for the preparation of the acid addition salts or, if desired, with a mono lower alkyl sulfate such as methyl sulfate or ethyl sulfate. The quaternary ammonium compound may also be converted into another quaternary salt directly without conversion into the quaternary ammonium hydroxide. Thus, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

When tested according to the procedure of Nickerson et al. [J. Pharm. Expt'l Ther., 89, 167 (1947)] the compounds of this invention show adrenolytic activity superior to that of dibenamine. When used for this purpose, the compounds may be incorporated into suitable pharmaceutical carriers either in the form of their bases or salt. The carrier may be either an organic or inorganic solid or liquid suitable for oral or parenteral administration. Inert substances which are suitable as carriers are water, glycerin, lactose, starch, magnesium stearate, talc, vegetable oils, benzyl alcohols, gums, polyalkylene glycols, etc. The preparations may be in the form of tablets, capsules, pills or suppositories, or in liquid form such as solutions, suspensions or emulsions.

The following examples are given to illustrate, but not to limit, the scope of the present invention.

*Example 1*

To a stirred and cooled suspension of 42.5 parts by weight of lithium aluminum hydride in 1500 parts by volume of ether is added gradually 116 parts by weight of 1-methyl-2,5-dicarbethoxyprrolidine in 250 parts by volume of ether. The mixture is refluxed for sixteen hours and the excess reagent is decomposed with 25% sodium hydroxide. The ether solution is decanted and the solvent removed. The residue is distilled yielding a colorless liquid, 1-methyl-2,5-bishydroxymethylpyrrolidine, boiling point /12 mm. 145° C.–150° C. $N_D^{27}$ 1.4895.

An ethereal solution of 18.7 parts by weight of 1-methyl-2,5-bishydroxymethylpyrrolidine is saturated with hydrogen chloride. The solvent is removed and to the hydrochloride is added 25 parts by volume of thionyl chloride and 100 parts by volume of dry benzene. The reaction mixture is heated for three hours at 60° C. The solvent is removed under reduced pressure and the solid residue is washed with hexane. The material is recrystallized several times from acetone and decolorized with charcoal yielding white needles of 1-methyl-2,5-bischloromethylpyrrolidine hydrochloride, melting point 147° C.–150° C.

*Example II*

To a stirred suspension of 4.1 parts by weight of lithium aluminum hydride and 200 parts by volume of ether is added dropwise a solution containing 16.3 parts by weight of 1-benzyl-2,5-dicarbethoxypyrrolidine and 20 parts by volume of ether. The suspension is refluxed and stirred for twenty-four hours and the excess reagent is destroyed with 25% sodium hydroxide solution. On distillation, 1-benzyl-2,5-bishydroxymethylpyrrolidine, boiling point /0.04 mm. 120° C.–125° C. is obtained.

10 parts by weight of the above diol are converted to a hydrochloride which is used as such without further purification. It is added to 20 parts by volume of benzene and 13 parts by volume of thionyl chloride and the mixture is heated at 60° C. for three hours. A crystalline product appears and is filtered off. The material is recrystallized several times from absolute ethanol and finally sublimed under reduced pressure to yield 1-benzyl-2,5-bischloromethylpyrrolidine hydrochloride, melting point 153° C.–156° C.

*Example III*

To a stirred suspension containing 3.5 parts by weight of lithium aluminum hydride and 250 parts by volume of ether is added dropwise 13 parts by weight of 1-β-phenethyl-2,5-dicarbethoxypyrrolidine in 50 parts by volume of ether. The reaction mixture is refluxed and stirred for sixteen hours and the excess hydride is decomposed with 25% potassium hydroxide. The ethereal solution is decanted and distilled to give 1-β-phenethyl-2,5-bishydroxymethylpyrrolidine, boiling point /0.02 mm. 159° C.–160° C.

Six parts by weight of 1-β-phenethyl-2,5-bishydroxymethylpyrrolidine is converted to its hydrochloride, 75 parts by volume of dry benzene and 8 parts by volume of thionyl chloride are added and the mixture is stirred and heated for three hours at 60° C. The solvent is removed in vacuo and the gummy residue is boiled briefly with 20 parts by volume of absolute ethanol. The alcohol is evaporated in vacuo and the residue is dissolved in water. The aqueous solution is washed with ether and neutralized with a concentrated potassium hydroxide solution. The oil is extracted with ether. The extract, upon drying and distillation, gives 1-β-phenethyl-2,5-bischloromethylpyrrolidine, boiling point /0.05 mm. 124° C.–126° C., which is converted into its picrate, melting point 181° C.–182° C., after several recrystallizations from ethyl alcohol.

*Example IV*

10 parts by weight of 1-phenyl-2,5-dicarbethoxypyrrolidine [V. Braun & Seemann, Ber. 56, 1840 (1923)] is converted to a hydrochloride which is added to 20 parts by volume of benzene and 12 parts by volume of thionyl chloride. The mixture is heated for three hours at 60° C. The solid product is filtered off and recrystallized from acetone to give 1-phenyl-2,5-bischloromethylpyrrolidine hydrochloride.

What is claimed is:
1. A member of the group consisting of 1-R-2,5-bishalomethylpyrrolidine wherein R is a member of the group consisting of lower alkyl, phenyl, halo-substituted phenyl, lower alkoxy-substituted phenyl, lower alkyl-substituted phenyl, benzyl and phenethyl, and therapeutically active addition salts.
2. 1-methyl-2,5-bischloromethylpyrrolidine.
3. The hydrochloride of the compound of claim 2.
4. 1-benzyl-2,5-bischloromethylpyrrolidine.
5. The hydrochloride of the compound of claim 4.
6. 1-β-phenethyl-2,5-bischloromethylpyrrolidine.
7. The picrate of the compound of claim 6.
8. 1-phenyl-2,5-bischloromethylpyrrolidine.
9. The hydrochloride of the compound of claim 8.

References Cited in the file of this patent

UNITED STATES PATENTS 2,695,301    Blicke _____ Nov. 23, 1954

OTHER REFERENCES

Braun et al.: Berichte, Deutsche Chem. Gesell, vol. 56, pp. 1840–44 (1923).

Gilman: J. American Chem. Soc., vol. 476, pp. 245–49 (1925).

Fieser: Organic Chemistry, pp. 148–49 (1950).

UNITED STATES PATENT OFFICE
CERTIFICATE OF CORRECTION

Patent No. 3,006,920                  October 31, 1961

Werner Richard Boehme et al.

It is hereby certified that error appears in the above numbered patent requiring correction and that the said Letters Patent should read as corrected below.

Column 4, line 32, after "active" insert -- acid --; line 50, for "vol. 476" read -- vol. 47 --.

Signed and sealed this 24th day of April 1962.

(SEAL)
Attest:

ESTON G. JOHNSON
Attesting Officer

DAVID L. LADD
Commissioner of Patents

Disclaimer 3,006,920.—*Werner Richard Boehme*, Somerville, and *Edgar Siegmund Schipper*, Highland Park, N.J. N-SUBSTITUTED 2,5,BISHALOMETHYL PYRROLIDINES. Patent dated Oct. 31, 1961. Disclaimer filed Jan. 21, 1964, by the assignee, *Ethicon, Inc.*

Hereby enters this disclaimer to claims 4 and 5 of said patent.

[*Official Gazette April 14, 1964.*]

Notice of Adverse Decision in Interference

In Interference No. 93,004 involving Patent No. 3,006,920, W. R. Boehme and E. S. Schipper, N-substituted 2,5,bishalomethylpyrrolidines, final judgment adverse to the patentees was rendered Nov. 12, 1963, as to claims 4 and 5.
[*Official Gazette December 22, 1964.*]